(12) United States Patent
Whalan

(10) Patent No.: US 8,226,260 B2
(45) Date of Patent: Jul. 24, 2012

(54) APPARATUS AND METHODS FOR DETERRING PREDATORS

(76) Inventor: Ian Lloyd Whalan, Oberon (AU)

( * ) Notice: Subject to any disclaimer, the term of this patent is extended or adjusted under 35 U.S.C. 154(b) by 69 days.

(21) Appl. No.: 12/811,707

(22) PCT Filed: Feb. 3, 2009

(86) PCT No.: PCT/AU2009/000117
§ 371 (c)(1),
(2), (4) Date: Jul. 6, 2010

(87) PCT Pub. No.: WO2009/100478
PCT Pub. Date: Aug. 20, 2009

(65) Prior Publication Data
US 2010/0315009 A1    Dec. 16, 2010

(30) Foreign Application Priority Data
Feb. 15, 2008    (AU) ................................ 2008900766

(51) Int. Cl.
*F21S 9/02* (2006.01)
*F21S 10/00* (2006.01)

(52) U.S. Cl. ............... 362/152; 362/191; 362/276
(58) Field of Classification Search ............... 362/152, 362/183, 191, 276; 340/573.2, 815.45
See application file for complete search history.

(56) References Cited

U.S. PATENT DOCUMENTS

| | | | |
|---|---|---|---|
| 4,841,278 A * | 6/1989 | Tezuka et al. | 340/908.1 |
| 5,453,729 A * | 9/1995 | Chu | 340/332 |
| 6,176,592 B1 * | 1/2001 | Kovacik et al. | 362/199 |
| 6,351,908 B1 * | 3/2002 | Thomas | 43/1 |
| 6,718,681 B2 * | 4/2004 | Bhullar | 43/1 |
| 7,364,319 B2 * | 4/2008 | Canella | 362/158 |
| 7,699,018 B2 * | 4/2010 | Wells | 116/22 A |
| 8,038,330 B2 * | 10/2011 | Liu | 362/413 |
| 2005/0190063 A1 * | 9/2005 | Lewis | 340/573.2 |
| 2006/0152941 A1 * | 7/2006 | Chiang | 362/540 |
| 2010/0027247 A1 * | 2/2010 | Olsen | 362/183 |

* cited by examiner

Primary Examiner — Peggy A. Neils
(74) Attorney, Agent, or Firm — Molins & Co.

(57) ABSTRACT

A lighting fixture for deterring predation has a case containing a battery and one or more sources of illumination. A controller acts to cause intermittent flashing of the sources of illumination because the apparent motion deters predators. The case may have a bracket adapted for attachment to a post.

11 Claims, 7 Drawing Sheets

APPARATUS AND METHODS FOR DETERRING PREDATORS

FIELD OF THE INVENTION

The invention relates to lighting apparatus and more particularly to a lighting apparatus that is intended to deter predators, such as foxes.

BACKGROUND OF THE INVENTION

Predators such as the European Red Fox are widely distributed across Australia (and other countries). The main agricultural impact from foxes is predation on lambs and goat kids. Foxes are thought to prey on 10-30% of lambs in some areas. Common fox control techniques include lethal baiting, shooting, trapping, den fumigation, and destruction and exclusion fencing. Considerable economic and human resources are dedicated to preventing fox predation. The national cost of direct fox predation on lambs is estimated at more than AUD100 million annually.

Sensible alternatives to current fox management tools are required. Preferred solution would have a minimal impact on the environment, be cost effective and reliable.

The present invention was made consequent to the discovery that an array of lights flashing in an irregular pattern is effecting in deterring night time predation by foxes. It is suspected that the array, visible to the foxes from a distance, and flashing irregularly, simulates to the fox, the appearance of humans. The inventor's experience over a number of years confirms that the aforementioned approach is extremely effective.

OBJECTS AND SUMMARY OF THE INVENTION

It is an object of the invention to provide a portable and preferably solar operated light that is adapted to deter fox predation.

In preferred embodiments, a plurality of lights are deployed in a array that defines a predation barrier.

In some embodiments, the deterrent light fixture is solar powered.

Accordingly, there is provided a portable lighting fixture that is battery operated. The fixture further comprises a main body and a support affixed to the main body. The support tube is closed at its upper end and is lower end is adapted to receive a star post or similar supporting post.

BRIEF DESCRIPTION OF THE DRAWING FIGURES

In order that the invention be better understood, reference is now made to the following drawing figures in which.

BEST MODE AND OTHER EMBODIMENTS

Figure 1:
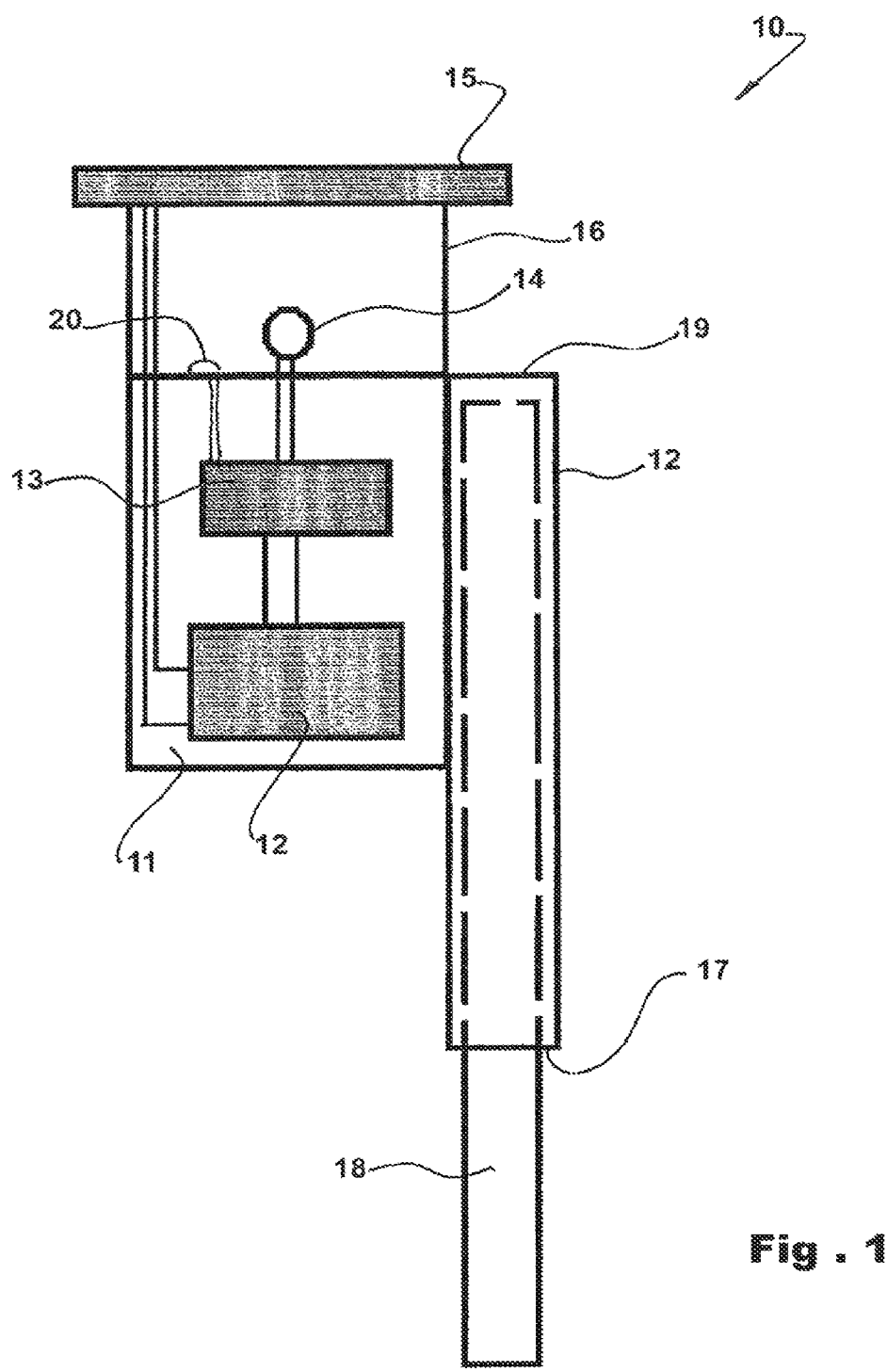
FIG. 1 is a schematic elevation of a lighting fixture made in accordance with the teachings of the present invention.

As shown in FIG. 1, a lighting fixture for deterring fox predation 10 comprises a main body 11 that is affixed to a support tube 12. The main body 11 is preferably watertight and includes a storage battery 12 and circuitry 13 for operating a light source such as an LED light source 14. In preferred embodiments, the batteries 12 are charged by a solar cell 15. In the example provided by FIG. 1, the light source 14 sits above the main body 11 within a transparent or translucent enclosure 16. The solar cell 15 sits atop the enclosure 16. An optional photocell 20 (in any embodiment) may be used so that the device operates only at night or under ow light conditions.

The main body 11 is affixed to the support tube but may be removable from it. The support tube 12 preferably includes an opening 17 at its lower end for receiving a star post or similar supporting post 18. The top 19 of the support tube 12 is preferably closed or blocked so that the post 18 does not protrude past the top 19.

In some embodiments, a method of deterring predators comprises the establishment of a perimeter using a number of lighting fixtures of the type depicted in FIG. 1. The control circuit 13 for the light source 14 preferably causes the light 14 to blink. In some embodiments, the light 14 is caused to blink not less than e.g. every 3 seconds. In other embodiments, the flashing pattern of the light is, within certain parameters, random or pseudo-random. When the perimeter is established with an array of lighting fixtures 10, the effect, whether the flashing is random or not, is of an irregular or at least non synchronised.

Figure 2:
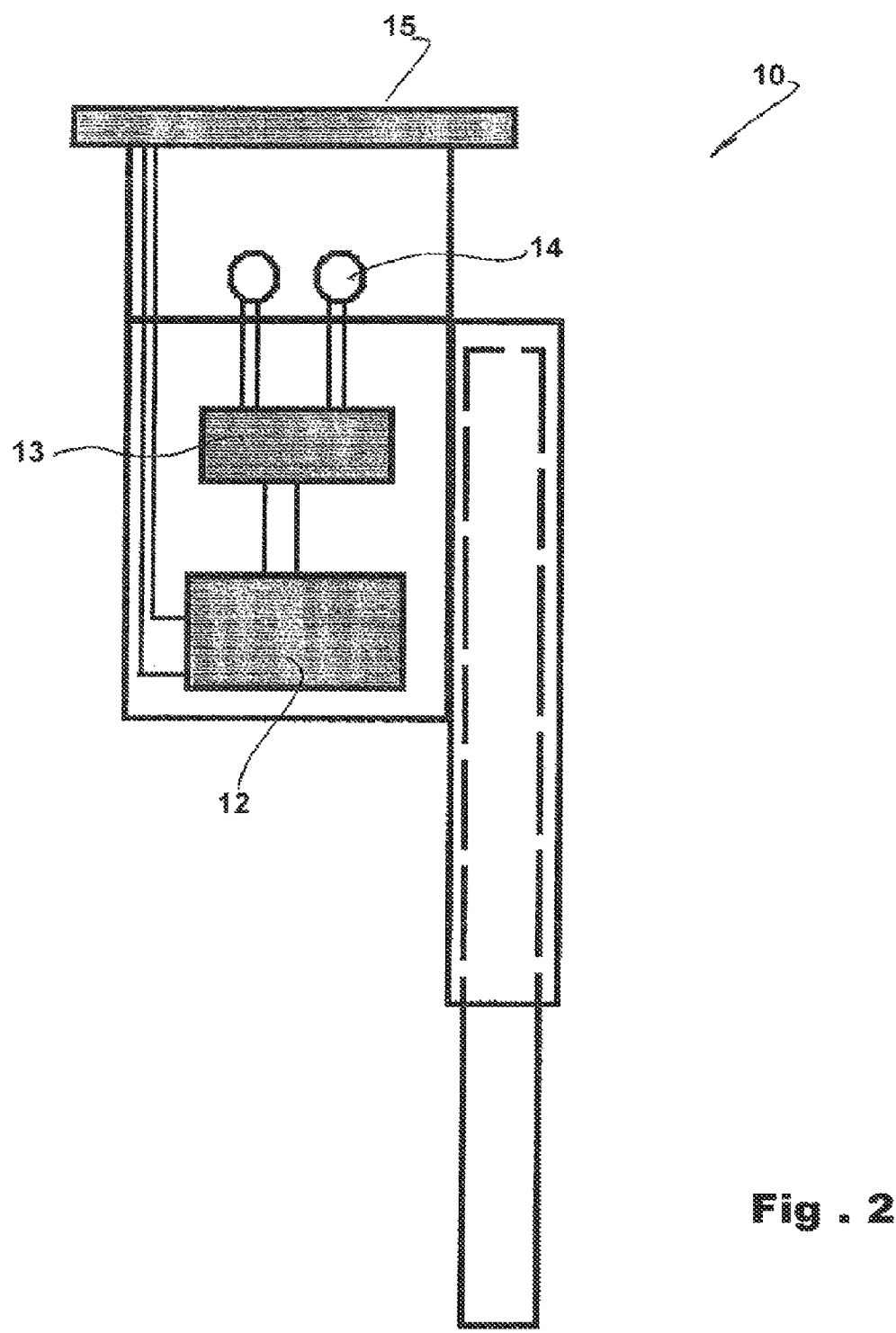
FIG. 2 is an alternative embodiment of a lighting fixture made in accordance with the teaching of the present invention.

In the embodiment depicted in FIG. 2, two or more light sources 14 are driven by the same battery 12. The controller 13 is adapted to drive each of the light sources 14 independently. Where more than one bulb is used, an illusion of an apparent movement can be created from a single fixture 10.

Different colour light sources 14 may be used within a single fixture 10.

Figure 3:
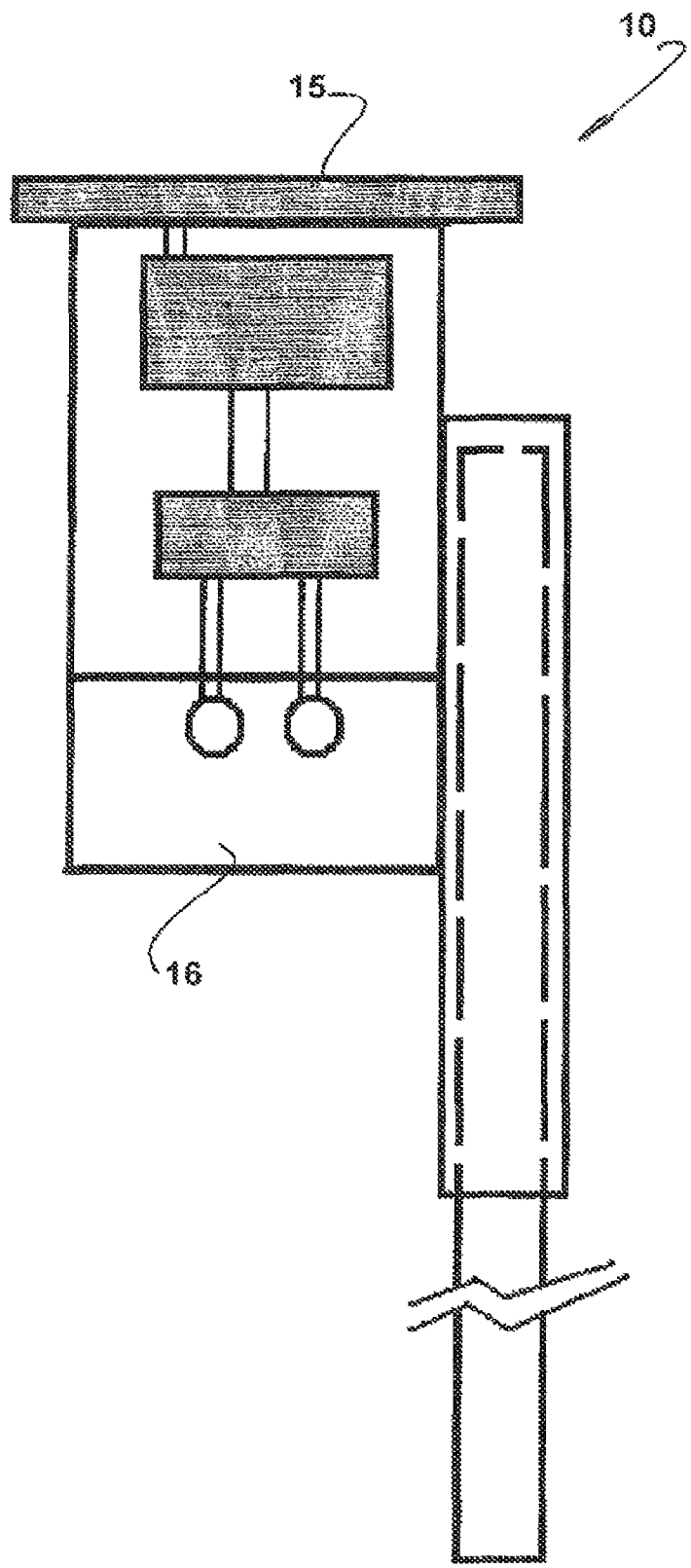
FIG. 3 is a further embodiment of a lighting fixture made in accordance with the teachings of the present invention.

As shown in FIG. 3, a predator deterring fixture 10 may be oriented with its transparent or translucent cover 16 facing downward. The orientation of the fixture 10 may depend on the height at which it is set above the ground.

Figure 4:
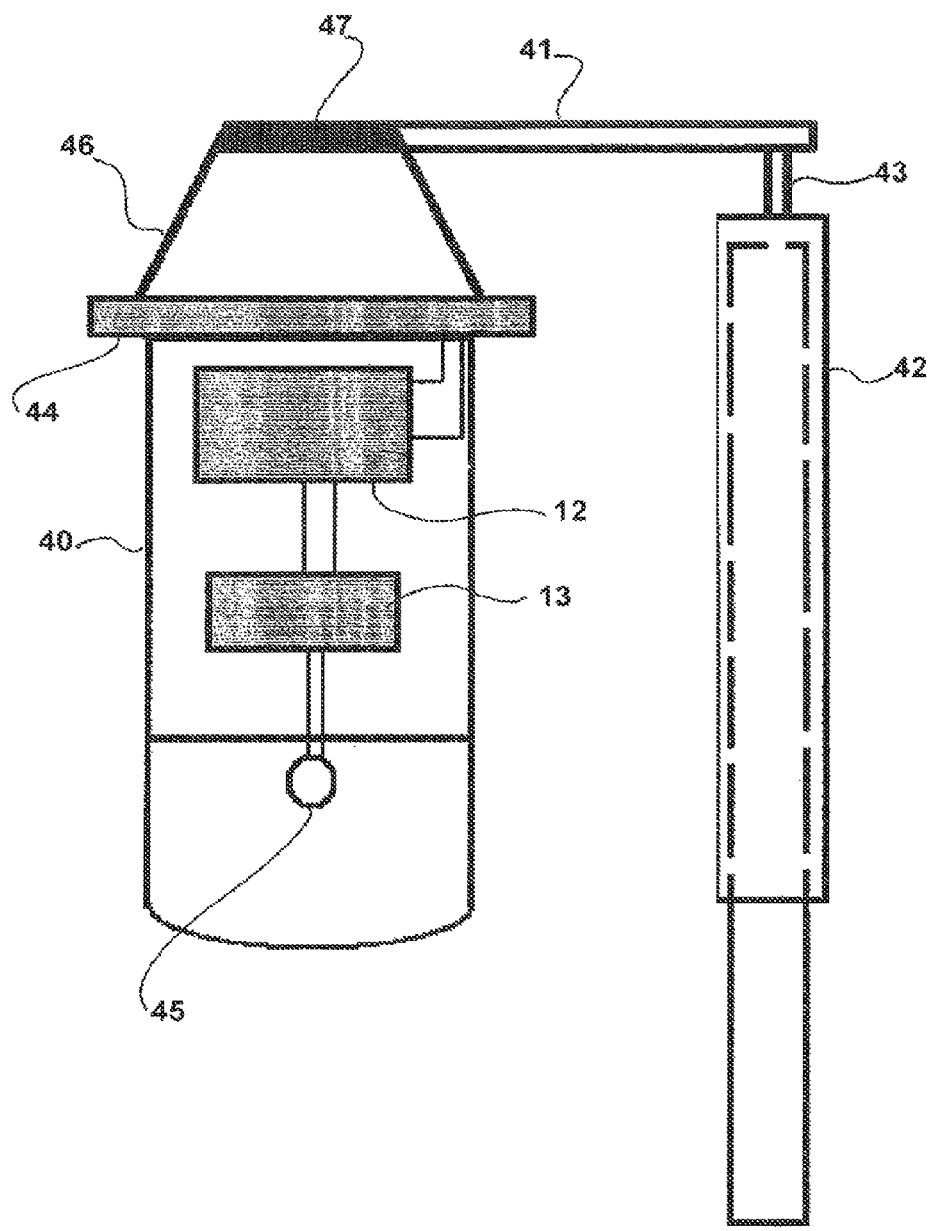
FIG. 4 is yet another embodiment made in accordance with the present invention.

Another embodiment of the invention is depicted in FIG. 4. In this embodiment, the main body 40 is suspended below an arm 41 that is affixed to the support tube 42. In this example, the arm 41 may optionally pivot about a spindle 43 that is attached to the tube 42. In this example, the main body 40, the solar cell 44 and the LED light 45 are all suspended by a harness 46 that may be hinged with respect to the arm 41. The hinge arrangement 47 between the harness 46 and the arm 41 allows the main body 40 to swing, but not in the direction of, or into, the support tube 42.

Figure 5:
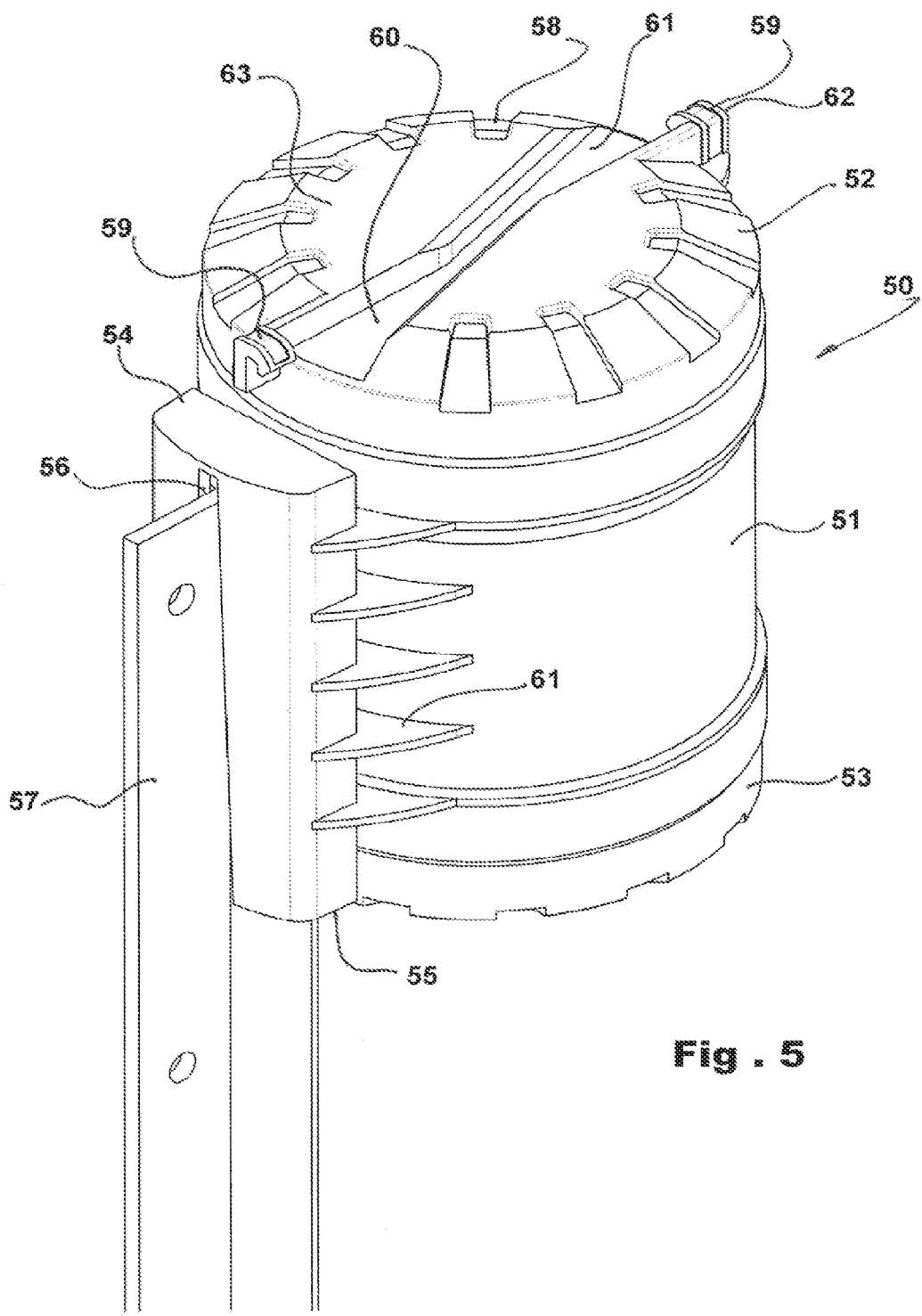
FIG. 5 is a top perspective view of a further embodiment of the invention.

A further embodiment of the invention is depicted in FIGS. 5-8. As shown in FIG. 5, a lighting fixture of deterring predation 50 comprises a case having an open ended body 51 that is terminated, for example, by a pair of screw caps 52, 53. The body is generally cylindrical and includes, for example, an integral mounting bracket 54 that allows the apparatus to be suspended from the top of a post or picket such as a start picket. In this example, the mounting bracket 54 comprises a chamber having a bottom opening 55 and a tapered downward opening slot 56 for receiving the picket 57.

The upper cap 52 (being a portion of the case) is preferably transparent or translucent so that the unit's internal lights (not shown in this view) can shine through it. The upper portion of the cap 52 features a plurality of grips or recesses 58 to facilitate unscrewing the cap from the body 51. In preferred embodiments, the cap 52 also includes a pair of suspension hooks 59 located at either end of a bisecting channel 60 that extends across a diameter of the top of the cap 52. The channel 60 is either wide enough or includes tapered regions 61 so as to allow a string, cord or wire to be inserted into the channel. With the string, cord or wire inserted into the channel 60, rotation of the device 50 around its longitudinal centre line will secure the suspension hooks 59 onto the string, cord or wire. In particularly preferred embodiments, the upper surfaces 62 of the hooks 59 are flush with, or below the level of the upper surface 63 of the cap 52. This feature is particularly useful when the top and bottom caps 52, 53 are made from the same or same type of mould cavity. It will be appreciated when a cap like the one described with reference to the top cap 52 is used as the bottom cap, it will be adapted to rest stably on a flat surface as no structure protrudes beyond the flat longitudinal extremity 63.

Figure 6:
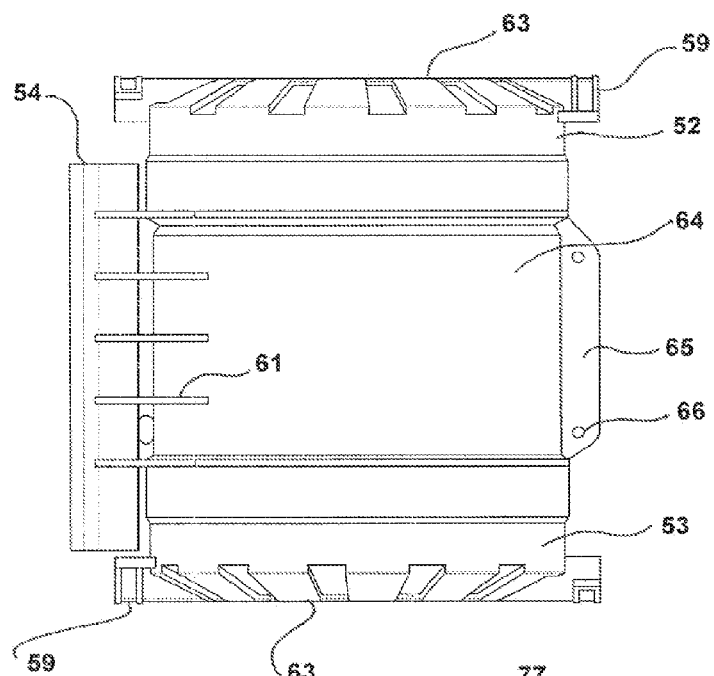
FIG. 6 is a side elevation of the device depicted in FIG. 5.
Figure 7:
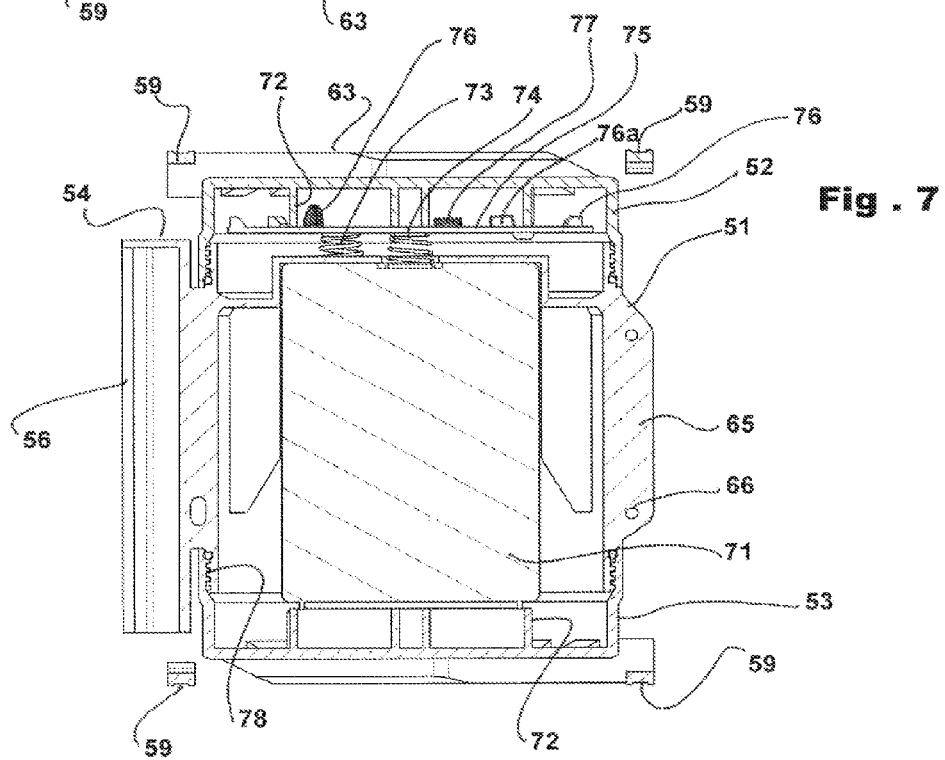
FIG. 7 is a cross section through the device depicted in FIG. 6.

As shown in FIG. 6, in some embodiments, the top cap 52 and bottom cap 53 are the same. This view also illustrates the reinforcing ribs 61 that assist in supporting the mounting channel 54 to the generally cylindrical body 64. An optional mounting flange 65 with one or more pre-formed attachment holes may be included. As previously mentioned, the top cap 52 is preferably translucent or transparent. The bottom cap 53 need not be, but may be, transparent or translucent. The two caps 52, 53 may be made from different materials. As shown in the cross section of FIG. 7 the body 51 contains a battery 71 such as a 6V lantern battery. The battery is supported from the bottom by ribs 72 formed internally of the bottom cap 53. The battery's electrical contacts 73, 74 extend to cooperating contacts on the underside of a printed circuit board 75 that is also retained in position by the internal supporting ribs 72 that extend from the interior surface of the top cap 52. In preferred embodiments, the upper surface of the printed circuit board 75 supports one or more light sources such as LED lights 76. The PCB may also support a light controller 76a and sensor 77. The light sensor eliminates the need for external switching, rendering the PCB's circuitry active once external light levels reach a pre-determined minimum. The PCB circuitry or controller 76a then activates the one or more light sources 76 in the manner previously described. FIG. 7 also illustrates the threaded interconnection 78 between the externally threaded ends of the body 51 and the internally threaded ends of the cap 52, 53.

Figure 8:
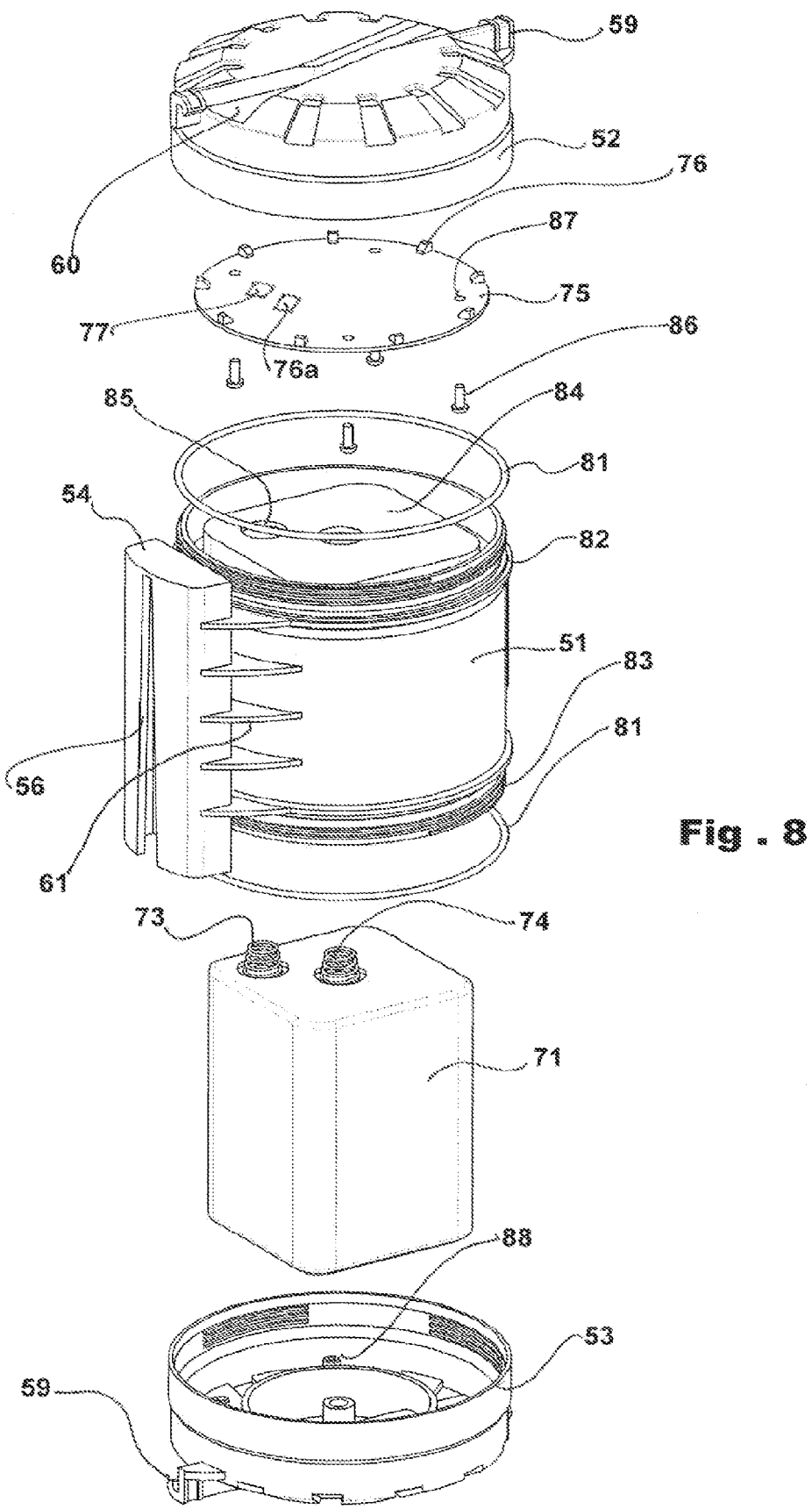
FIG. 8 is an exploded perspective of the device depicted in FIGS. 5-7.

As shown in FIG. 8, a water tight polymeric seal such as an O-ring seal 81 may be interposed between the threaded ends 82, 83 of the body 51 and the threaded caps 52, 53. In this example, a separate insert 84 is positioned within the upper opening of the body 51 to better stabilise the position of the battery 71. The stabilising insert 84 has openings 85 for receiving the battery's terminals 73, 74. In this example, the printed circuit board 75 is attached to the interior of the translucent or transparent upper cap 52 by fasteners 86 that pass through openings 87 in the PCB and into the bosses 88 of the underside or interior of the upper cap 52. Comparable bosses 88 for receiving the fasteners 86 are visible in the lower cap 53 of FIG. 8.

FIG. 8 also illustrates that the LEDs 76 are, in this example, nine in number and disposed about the perimeter of the round PCB 75. The PCB 75 is sized to fit substantially across the entire internal diameter of the interior of the case. This creates a maximum practical separation between diametrically opposite LEDs 76. In this example, the LEDs 76 are arranged in three groups of three. In one example, a group comprises three adjacent LEDs. Other permutations may used. Thus, the controller can activate each of the groups in sequence. Each of the three groups are illuminated or activated (and deactivated) in a sequence. The sequence creates an apparent movement in the source of illumination that is particularly useful in deterring predation. The LEDs can also be activated individually in a number of different sequence types so as to create the maximum visual impression and deterrent effect.

It will be appreciated that because the purpose of the lighting fixture is to deter predation, it is an object to create a significant visual disturbance, particularly of a threatening nature, preferably involving considerable apparent movement in the illumination. Thus, it is preferred that sources of illumination be as far apart as practical within the confines of the case and that the sequence of illumination be one that induces a significant apparent motion. A sequence may include considerable delay between illuminations and even random components in the sequence. Randomness can be used in the duration of the illumination of a given LED or in the dark interval between activations.

In preferred embodiments, the lighting fixture of the present invention does not require or benefit from an external switch. Because the fixture activates itself when ambient light levels reach a predetermined minimum (owing to the action of the light sensor and controller (76a, 77) and because the fixtures are left in place for long periods of time and are fairly efficient, an external switch is not required. A user wishing to disable a fixture need only remove the bottom cap 53 and extract the battery 71.

While the present invention has been disclosed with reference to particular details of construction, these should be understood as having been provided by way of example and not as limitations to the scope or spirit of the invention.

What is claimed is:

1. A lighting fixture for deterring predation, comprising:
a case containing a battery and two or more sources of illumination;
the case having a transparent portion through which the sources of illumination can shine;
a light sensor and a controller acting to activate the sources when the ambient illumination reaches a predetermined minimum;
the controller acting to cause random intermittent flashing of the sources of illumination so as to create an illusion of apparent movement;
the case further comprising an open ended body having a cap at each end;
the caps are being of the same shape and each having one or more suspension hooks that are flush with or below the level of a flat longitudinal extremity of the cap.

2. The lighting fixture of claim 1, wherein:
the one or more hooks are adjacent to a channel for receiving a fence wire that bisects the cap.

3. The lighting fixture of claim 1, wherein:
the case has a bracket for attaching the case to a post.

4. The lighting fixture of claim 1, wherein:
the caps are the same shape, but made from different materials; and
one cap is transparent or translucent.

5. The lighting fixture of claim 2, wherein:
the channel is tapered at each end to facilitate twisting of the fixture onto a wire.

6. The lighting fixture of claim 2, wherein:
the hooks are two in number, one located at each end of the channel.

7. A lighting fixture for deterring predation, comprising:

a case containing a battery and two or more sources of illumination;

the case having a transparent portion through which the sources of illumination can shine;

an illumination controller acting to activate the sources in a sequence;

the case having a bracket adapted for attaching the case to a post; wherein the caps are the same shape and each has a bisecting channel for receiving a fence wire, each cap having one or more hooks adjacent to the channel, the hook or hooks being flush with or below the level of a longitudinal extremity of the cap.

8. The lighting fixture of claim 7, wherein:

the caps are the same shape, but made from different materials; and one cap is transparent or translucent.

9. The lighting fixture of claim 7, wherein:

the hooks on a cap are two in number, one located at each end of the channel.

10. A lighting fixture for deterring predation, comprising:

a case containing a battery and two or more sources of illumination;

the case having a transparent portion through which the sources of illumination can shine;

a light sensor and a controller acting to activate the sources when the ambient illumination reaches a predetermined minimum;

the controller acting to intermittent flashing of the source of illumination in a sequence;

the fixture lacking an external on-off switch; wherein the case further comprises two end caps that are the same shape, each cap having a bisecting channel for receiving a fence wire, each cap having one or more hooks adjacent to the channel, the hook or hooks being flush with or below the level of a longitudinal extremity of the cap.

11. The lighting fixture of claim 10, wherein:

the case further comprises an open ended body having a cap at each end;

at least one cap having a suspension hook; and at least one cap being transparent or translucent.

* * * * *